D. DAWSON.
MOTOR CYCLE SUPPORTING, BALANCING, AND BRAKING MEANS.
APPLICATION FILED OCT. 22, 1915.
1,185,381.
Patented May 30, 1916.
2 SHEETS—SHEET 1.
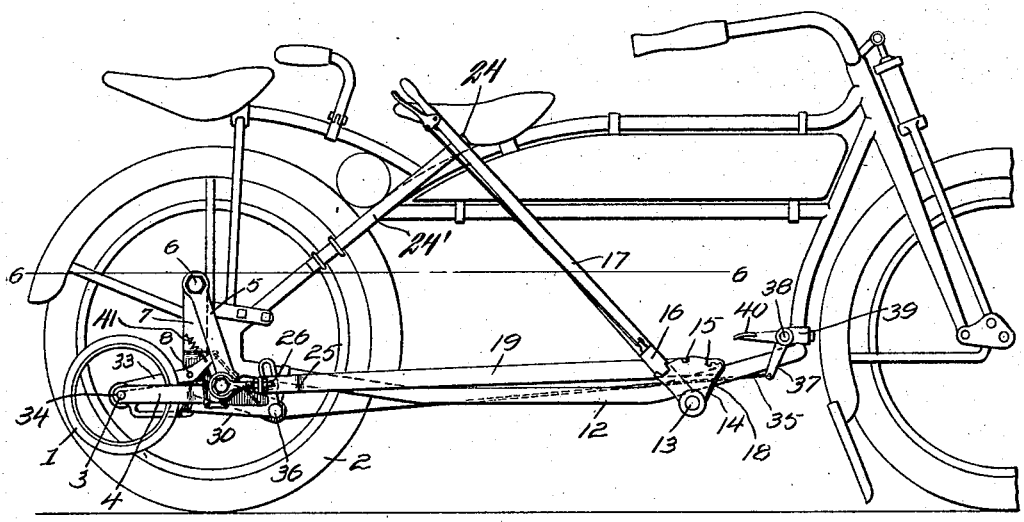
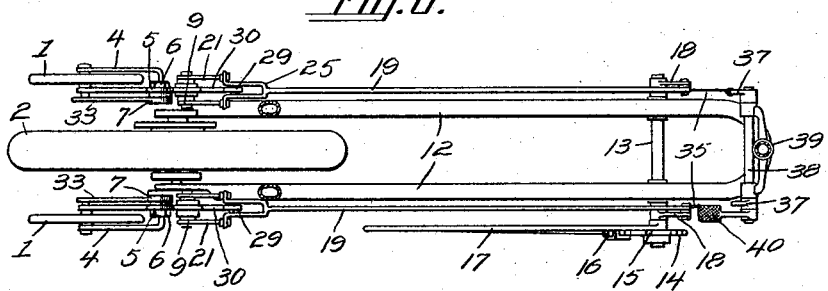
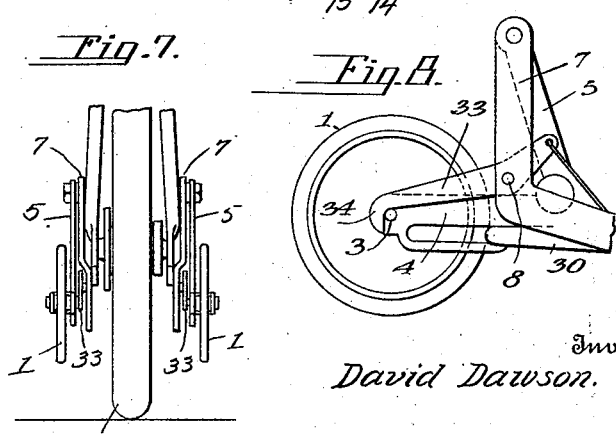
Inventor
David Dawson.
Witnesses
By Victor J. Evans
Attorney D. DAWSON.
MOTOR CYCLE SUPPORTING, BALANCING, AND BRAKING MEANS.
APPLICATION FILED OCT. 22, 1915.
1,185,381.
Patented May 30, 1916.
2 SHEETS—SHEET 2.
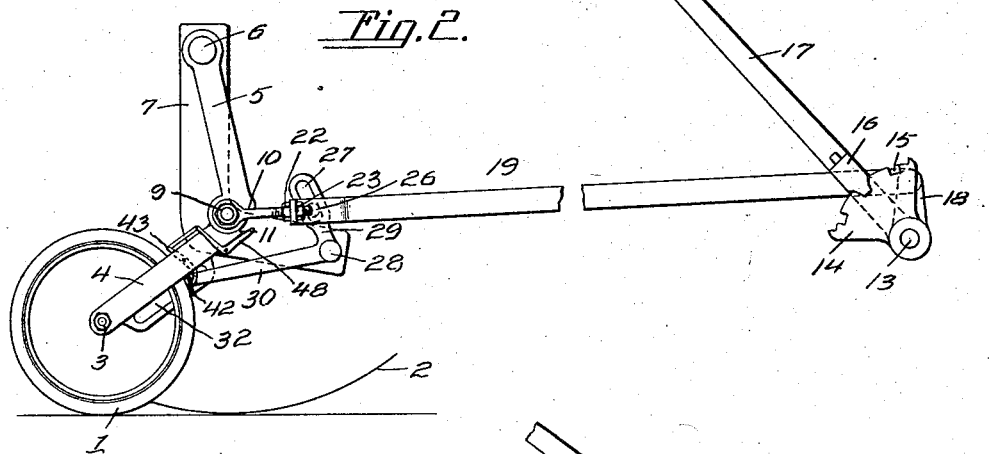
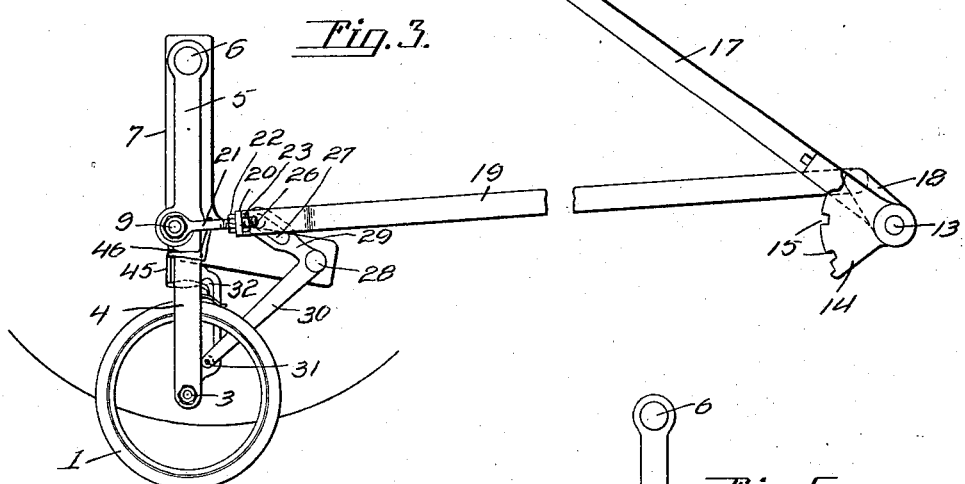
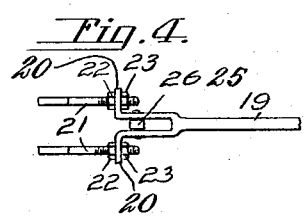
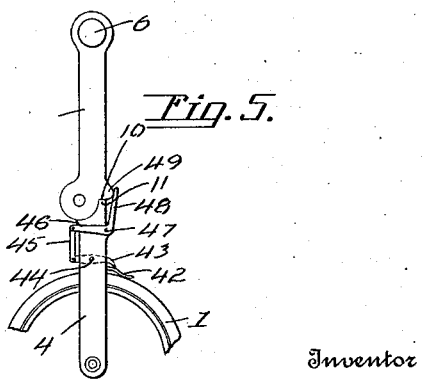
Witnesses
F. C. Gibson
R. M. Smith
Inventor
David Dawson.
By Victor J. Evans
Attorney

UNITED STATES PATENT OFFICE.

DAVID DAWSON, OF ELMIRA, NEW YORK, ASSIGNOR OF ONE-THIRD TO CHARLES J. McCARTHY, OF ELMIRA, NEW YORK.

MOTOR-CYCLE SUPPORTING, BALANCING, AND BRAKING MEANS.

1,185,381. Specification of Letters Patent. Patented May 30, 1916.

Application filed October 22, 1915. Serial No. 57,328.

*To all whom it may concern:*

Be it known that I, DAVID DAWSON, a citizen of the United States, residing at Elmira, in the county of Chemung and State of New York, have invented new and useful Improvements in Motor-Cycle Supporting, Balancing, and Braking Means, of which the following is a specification.

This invention relates to motorcycle supporting, balancing and braking means, the broad object of the invention being to provide in connection with a motorcycle or similar vehicle, means whereby the operation of the motorcycle may be rendered safe, the device while being particularly valuable to beginners and elderly persons being also of great value to drivers in general.

The apparatus hereinafter particularly described is carried by and supported upon the frame of a motorcycle and is always ready for instant use when required.

One of the main objects of the invention is to provide supporting and balancing wheels, which will hereinafter be designated as ground wheels, together with means under the control of the driver in his seat, for raising said ground wheels out of contact with the ground, means for holding said wheels in such position and releasing them instantly whenever desired, and means for pressing said wheels against the ground, and further depressing said wheels until they sustain the driving wheel of the motorcycle out of contact with the ground.

A further object of the invention is to provide means whereby the ground wheels may be locked while they as well as the driving wheel of the machine are in contact with the ground; also while said ground wheels are depressed to their full limit in which position they sustain the driving wheel of the machine out of contact with the ground.

A further object in view is to provide braking means for resisting the turning movement of the ground wheels, said braking means being automatically thrown into action during the downward movement of said wheels and thereby serving to check the forward movement of the machine and bring the same to a stop.

A further object of the invention is to provide in conjunction with the means for raising and depressing the ground wheels, means for raising said ground wheels with an accelerated translative movement.

With the above and other objects in view, the nature of which will more fully appear as the description proceeds, the invention consists in the novel construction, combination and arrangement of parts, as herein described, illustrated and claimed.

In the accompanying drawings: Figure 1 is a side elevation showing the apparatus of this invention in its applied relation to a motorcycle, the apparatus being shown in its raised or inoperative position. Fig. 2 is a similar view with parts broken away, showing the balancing position of the ground wheels and the operating connections. Fig. 3 is a similar view showing the ground wheels depressed to their limit and the operating connections in corresponding positions. Fig. 4 is a fragmentary plan of one of the thrust members and parts attached thereto. Fig. 5 is a fragmentary side elevation illustrating the brake mechanism. Fig. 6 is a horizontal section on the line 6—6 of Fig. 1. Fig. 7 is a partial rear elevation of the machine. Fig. 8 is a fragmentary side elevation showing one of the dogs in its supporting relation to one of the balancing wheels.

Referring to the drawings 1 designates a pair of supporting and balancing wheels, hereinafter designated as ground wheels, the same being located at opposite sides of the machine and so connected with the machine frame that when the wheels 1 are fully depressed as shown in Fig. 3, they will be nearly in transverse alinement with the bottom of the driving wheel 2 of the motorcycle. Each of the ground wheels 1 is journaled at 3 in the lower member 4 of a set of toggle-arms, the other member 5 of the toggle-arms being pivotally supported at its upper end at 6 on a hanger 7 shown as forming a stationary section of the frame of the motorcycle. It is to be understood however that the frame of the motorcycle may be constructed so as to include the hanger 7, the main function of said hanger being to provide for the pivot 6 and another pivot 8 the purpose of which will hereinafter appear.

The toggle-arms 4 and 5 are pivotally connected together at 9 by a rule joint enabling the joints between the arms 4 and 5 to break in a forward direction while at the same time serving to sustain said arms substantially in longitudinal alinement with each other when the parts are moved to the position illustrated in Fig. 3. It is preferred to have the meeting shoulders 10 and 11 of the joint so arranged as to permit the joint 9 to be located somewhat to the rear of a line drawn through the points 3 and 6, thereby avoiding any tendency of the joint to break in a forward direction while the machine is in operation.

Mounted in bearings on the under side of the bottom portion 12 of the frame which supports the motor, is a rock shaft 13 having fast on one end thereof a sector 14 provided with notches 15 to be engaged by a thumb latch 16 mounted upon and carried by a hand lever 17, the lower end of which is normally loose on the shaft 13. The shaft 13 also has fast thereon arms 18 arranged at opposite sides of the center of the machine and having pivotally connected thereto thrust members 19 the rear extremities of which are connected to the pivots 9 of the joints of the toggle-arms 4 and 5 at opposite sides of the machine. In order to secure an accurate adjustment, each thrust member 19 has the rear end thereof bent to form an ear 20 through which is inserted the shank of a screw eye 21, said shank being adjustably held by means of nuts 22 and 23 bearing against the opposite faces of the ear 20.

It being understood that the lever 17 is movable relatively to the sector 14 and that the latter is fast on the shaft 13, the operation of the mechanism just hereinabove described will now be understood. With the parts arranged as shown in Fig. 1, the lever is prevented from moving in a forward direction by the stop lip 24 at the upper and forward extremity of a bar 24' which is fastened in fixed relation to the machine frame. To move the ground wheels 1 downwardly into contact with the ground, the latch 16 is disengaged from the sector 14 and the lever 17 is then moved laterally out of engagement with the stop 24 and the upper end of the lever carried forward until the latch 16 snaps into the middle notch 15 of the sector 14. Then the operator pulls backwardly on the lever 17 and causes the thrust bar 19 to act on the toggle arms until the latter are brought to the position illustrated in Fig. 2. During this rearward movement of the bar 19, the pivot 9 is thrust rearwardly and at the same time the lever 30 acts to pull forwardly on the lower toggle arm 4. The lever 17 is then engaged behind the stop 24 thus maintaining the parts in the position shown in Fig. 2. To move the ground wheels 1 to the position shown in Fig. 3, the same operation just described is repeated, the latch 16 being withdrawn from the middle notch and the lever 17 again moved forwardly until said latch snaps into the foremost notch 15 of the sector 14. Then by a rearward movement of the lever 17 the rock shaft 13 is turned so as to force the thrust member 19 still farther to the rear where it acts in the same manner on the toggle arms. In the last named position of the parts illustrated in Fig. 3, it is unnecessary to have the lever in contact with the stop 24 as said lever may lie against the bar 24' at any point in the length of the latter. In the position of Fig. 1, the dogs 33 hold the ground wheels 1 in their fully elevated position. The parts are moved from the position shown in Fig. 3 to the positions shown in Figs. 2 and 1 by reversing the steps or operations above described.

In order to accelerate the upward movement of the ground wheels 1 to the position shown in Fig. 1, each of the thrust members 19 has its rear end portion forked as shown at 25 and a roller 26 is journaled in said fork, said roller being arranged to travel back and forth in the slot 27 of a bell crank lever pivotally supported at 28 on the hanger 7 and comprising a short arm 29 in which the slot 27 is formed and a longer arm 30 carrying at its extremity a roller 31 which is movable in a slot 32 extending lengthwise of the adjacent lower toggle-arm 4. Thus as each thrust member 19 is moved in a forward direction, it acts on the shorter arm 29 of said bell crank lever and on account of the increased length of the arm 30 of said lever, an accelerated or greater movement is imparted to the lower extremity of the adjacent toggle-arm 4 thus effecting a quick lifting movement of the adjacent ground wheel 1. The mechanism just described is duplicated at both sides of the machine so as to equally affect both of the ground wheels 1.

The means for holding and releasing the ground wheels 1 consists of a pair of holding dogs or detents 33 which are mounted intermediate their ends on the pivots 8 above referred to. Each of said dogs 33 is provided with a hook-shaped extremity 34 to engage around the journal 3 of the adjacent ground wheel 1 and the other or forward arm of each dog has attached thereto a flexible connection 35 which passes under a roller on the shaft 36 which forms the pivot for the bell crank levers 30. The forward extremities of the connections 35 are attached to downwardly extending arms 37 of a rock shaft 38 journaled in bearings formed in a bracket 39 secured to the forward portion of the frame of the machine. The shaft 38 is also provided with a foot pedal 40 by depressing which the dogs 33 may be moved out of engagement with the ground wheels 1 to release the same. Each of the dogs 33 is normally pressed into engagement with the journal of the respective ground wheel 1 by means of a spring 41, said spring moving the dog to locking position when there is no pressure on the pedal 40. The dogs 33 are used only to support the ground wheels when fully elevated, being auxiliary to and independent of the lever 17. In conjunction with each ground wheel 1 I employ braking means shown as consisting of a brake shoe 42 the normal tendency of which is to move away from or out of contact with said ground wheel. Coöperating with the brake shoe 42 is a lever 43 pivotally mounted at 44 on the lower toggle-arm 4 and coupled by a connection 45 to an elbow lever 46 also pivotally mounted at 47 on the toggle-arm 4 and embodying an upwardly extending arm 48 which works in contact with a lug or projection 49 at the lower extremity of the upper toggle-arm 5.

The arrangement of the parts just described is such that when the toggle arms 4 and 5 are at an angle to each other, the arm 48 of the elbow lever 46 rests against the adjacent front side of the toggle-arm 4 and allows the brake shoe 42 to move out of contact with the wheel 1. This is the normal position of the parts last referred to when the ground wheels 1 are either in the position shown in Fig. 1 or in the position shown in Fig. 2. When the ground wheels 1 are forced to the position shown in Fig. 3, the lug or projection 49 presses outwardly on the lever 48 and, through the connections described, applies the brake shoe 42.

The brake mechanism just described is of course duplicated at both sides of the machine and therefore when the ground wheels are fully depressed and the driving wheel 2 of the machine is raised out of contact with the ground, the rear of the machine is supported entirely by the ground wheels to which the brakes are then applied for the obvious purpose of retarding the progress of the machine and eventually bringing the same to a stop without any danger or likelihood of the machine falling to one side or the other. When the ground wheels 1 are locked in the position shown in Fig. 2 they serve as balancing wheels for the machine especially adapting the machine to novices. When the ground wheels 1 are in the position shown in Fig. 3, they enable the driver to mount the machine and start the motor and then elevate the ground wheels until the driving wheel 2 of the machine contacts with the ground and propels the machine forward. The ground wheels 1 are then moved to the position shown in Fig. 1 where they have no effect whatever in the ordinary operation of the motorcycle.

Having thus described my invention, I claim:—

1. The combination with a motorcycle, of ground wheels arranged at opposite sides thereof, means controlled from the driver's seat for elevating said wheels out of contact with the ground and depressing said wheels until the driving wheel of the machine is raised out of contact with the ground, and brake mechanism automatically thrown into operation during the downward movement of said ground wheels for resisting the rotation of said ground wheels when in contact with the ground.

2. The combination with a motorcycle, of ground wheels arranged at opposite sides thereof, means controlled from the driver's seat for elevating said wheels out of contact with the ground and pressing said wheels against the ground, and independent means controlled from the driver's seat for holding said wheels in their elevated position and releasing the same.

3. The combination with a motorcycle, of ground wheels arranged at opposite sides thereof, means controlled from the driver's seat for elevating said wheels out of contact with the ground and pressing said wheels against the ground, said means comprising toggle-arms connecting said wheels with the machine frame, a hand lever, thrust members between said lever and toggle-arms, and levers actuated by said thrust members and connected with the lower toggle arms to impart an accelerated movement to the latter.

4. The combination with a motorcycle, of a ground wheel arranged at the side thereof, means controlled from the driver's seat for elevating said wheel out of contact with the ground and pressing said wheel against the ground, said means comprising a pair of jointed toggle arms one carrying the ground wheel and the other connected with the machine frame, a hand lever, a thrust member actuated by said lever and acting to move the jointed ends of the toggle arms in one direction, and means actuated by said thrust member operating to simultaneously move the free end of the wheel carrying arm in the opposite direction.

5. The combination with a motorcycle, of ground wheels arranged at opposite sides thereof, means controlled from the driver's seat for elevating said wheels out of contact with the ground and pressing said wheels against the ground, said means comprising toggle-arms connecting said wheels with the machine frame, a hand lever, thrust members between said lever and toggle-arms, and means actuated by said thrust members operating to elevate said ground wheels with an accelerated translative movement.

6. The combination with a motorcycle, of ground wheels arranged at opposite sides thereof, means controlled from the driver's seat for elevating said wheels out of contact with the ground and pressing said wheels against the ground, said means comprising toggle-arms connecting said wheels with the machine frame, a rock shaft, a sector fast on said shaft, arms also fast on said shaft, a thumb latch lever loose on said shaft and adapted to engage said sector at any one of a plurality of points, and thrust members connecting the arms of the rock shaft with said toggle-arms.

In testimony whereof I affix my signature in presence of two witnesses.

DAVID DAWSON.

Witnesses:
E. HUME TALBERT,
BENNETT S. JONES.

Copies of this patent may be obtained for five cents each, by addressing the "Commissioner of Patents, Washington, D. C."